United States Patent
Chidlovskii (10) Patent No.: US 8,612,364 B2
(45) Date of Patent: Dec. 17, 2013

(54) METHOD FOR CATEGORIZING LINKED DOCUMENTS BY CO-TRAINED LABEL EXPANSION

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1054 days.

(21) Appl. No.: 12/608,272

(22) Filed: Oct. 29, 2009

(65) Prior Publication Data

US 2011/0106732 A1    May 5, 2011

(51) Int. Cl.
    *G06F 15/18*      (2006.01)

(52) U.S. Cl.
    USPC .......................................................... 706/12

(58) Field of Classification Search
    USPC .......................................................... 706/12
    See application file for complete search history.

(56) References Cited

U.S. PATENT DOCUMENTS

| | | | |
|---|---|---|---|
| 6,799,162 B1 | 9/2004 | Goronzy et al. | |
| 7,260,568 B2 * | 8/2007 | Zhang et al. | 707/711 |
| 7,318,022 B2 | 1/2008 | Li | |
| 7,366,705 B2 * | 4/2008 | Zeng et al. | 706/20 |
| 7,412,425 B2 | 8/2008 | Rifkin et al. | |
| 2005/0131850 A1 | 6/2005 | Cao et al. | |
| 2009/0137924 A1 * | 5/2009 | Kapoor et al. | 600/545 |
| 2010/0324883 A1 * | 12/2010 | Platt et al. | 706/12 |

OTHER PUBLICATIONS

Lee C.H. et al. "Stylistic and Lexical Co-training for Web Block Classification". WIDM'04, Nov. 12-13, 2004, pp. 136-143.*
Wen H. et al. "Automatic Web Page Classification Using Various Features". PCM 2008, LNCS 5353, pp. 368-376, 2008.*
Sindhwani, V. et al. "A Co-Regularization Approach to Semi-supervised Learning with Multiple Views". Proceedings of the Workshop on Learning withMultiple Views, 22 nd ICML, Bonn, Germany, 2005. 6 pages.*
Balcan M-F. et al. "Co-Training and Expansion: Towards Bridging Theory and Practice". In: Neural Information Processing Systems. MIT Press. 2005. 8 pages.*
Zhou Z.-H. et al. "Tri-training: exploiting unlabeled data using three classifiers." IEEE Transactions on Knowledge and Data Engineering, 17:1529-1541, 2005.*
Trentini, F. et al. "A Self-Organising Map Approach for Clustering of XML Documents". 2006 International Joint Conference on Neural Networks. Jul. 16-21, 2006. pp. 1805-1812.*
Lau A.M. "Advancing PARCELS: PARser for Content Extraction and Logical Structure using Inter- and Intra- Similarity Features." Technical report, National University of Singapore, 2005. 47 pages.*

(Continued)

*Primary Examiner* — Jeffrey A Gaffin
*Assistant Examiner* — Benjamin Buss
(74) *Attorney, Agent, or Firm* — Fay Sharpe LLP (57) ABSTRACT

Systems and methods are described that facilitate categorizing a group of linked web pages. A plurality of web pages each contains at least one link to another page within the group. A feature analyzer evaluates features associated with the one or more web pages to identify content, layout, links and/or metadata associated with the one or more web pages and identifies features that are labeled and features that are unlabeled. A graphing component creates a vector associated with each web page feature wherein vectors for unlabeled features are determined by their graphical proximity to features that are labeled. A co-training component receives the graph of vectors from the graphing component and leverages the disparate web page features to categorize each aspect of each feature of the page. A page categorizer receives aspect categorization information from the co-training component and categorizes the web page based at least upon this information.

20 Claims, 10 Drawing Sheets

(56) References Cited

OTHER PUBLICATIONS

Cohen, W.W. "Improving A Page Classifier with Anchor Extraction and Link Analysis". In Advances in Neural Information Processing Systems, vol. 15. MIT Press. 2002. 8 pages.*

Tang, F. et al. "Co-Tracking Using Semi-Supervised Support Vector Machines". IEEE, 2007. 8 pages.*

Li, C.H. et al. "Constrained Minimum Cut for Classification Using Labeled and Unlabeled data". IEEE. 2001. pp. 597-602.*

Shen, Y.K. "Automatic Record Extraction for the World Wide Web". Thesis. Masachusetts Institute of Technology. Feb. 2006. 152 pages.*

Park, S-B. et al. "Co-trained support vector machines for large scale unstructured document classification using unlabeled data and syntactic information" Information Processing and Management, vol. 40. pp. 421-439. 2004.*

A. Blum et al., "Combining Labeled and Unlabeled Data with Co-training." Proc. 11th Annual Conference on Computational Learning Theory, pp. 92-100, 1998.

J. Chan et al., "Co-training with a single natural feature set applied to email classification." WI '04: Proceedings of the 2004 IEEE/WIC/ACM International Conference on Web Intelligence, pp. 586-589, Washington, DC, USA, 2004. IEEE Computer Society.

T. Joachims, "Transductive inference for text classification using support vector machines." In ICML '99: Proceedings of the Sixteenth International Conference on Machine Learning, pp. 200-209, San Francisco, CA, USA, 1999. Morgan Kaufmann Publishers Inc.

C. Muller et al., "Applying co-training to reference resolution." ACL '02: Proceedings of the 40th Annual Meeting on Association for Computational Linguistics, pp. 352-359, Morristown, NJ, USA, 2001. Association for Computational Linguistics.

K. Nigam et al., "Analyzng the effectiveness and applicability of co-training." CIKM '00: Proceedings of the ninth international conference on Information and knowledge management, pp. 86-93, New York, NY, USA, 2000. ACM.

A. Sarker, "Applying co-training methods to statistical parsing." NAACL '01: Second meeting of the North American Chapter of the Association for Computational Linguistics on Language technologies 2001, pp. 1-8, Morristown, NJ, USA, 2001. Association for Computational Linguistics.

D. Zhou et al., "Learning with local and global consistency." Advances in Neural Information Processing Systems 16, pp. 321-328. MIT Press, 2004.

X. Zhu et al., "Semisupervised learning using Gaussian fields and harmonic functions." Proceedings of the Twentieth International Conference on Machine Learning, pp. 912-919, 2003.

* cited by examiner

METHOD FOR CATEGORIZING LINKED DOCUMENTS BY CO-TRAINED LABEL EXPANSION

BACKGROUND

The subject application generally relates to content within linked web documents. In one particular example, unlabeled content within the linked documents is categorized via co-trained label expansion. It will be appreciated that the described techniques may find application in other systems and/or other methods.

In today's information age, individuals have access to a quantity and breadth of information never before possible. The information can be presented via interlinked web pages containing articles posted by users, which are accessed via the Internet. The articles can contain a wide range of content including text, images, video, etc. related to particular topics. Each article can be assigned one or more metadata tags to indicate a particular topic and/or subject matter related to the content within the article.

In this manner, articles can be labeled based at least in part upon such tags to facilitate subsequent organization and retrieval thereof. Manual labeling of content, however, is both time consuming and expensive. Thus, labeled content generally represents only a fraction of the total amount of information available on the Internet in general and linked documents in particular. If information is not labeled, alternative and generally inefficient search methods can be employed to try and identify relevant information.

In one example, a search engine is used as a low cost alternative although results may be difficult or impossible to navigate. For instance, one web page with relevant content can be identified along with hundreds of other web pages containing irrelevant content. This problem is exacerbated by the voluminous sources of information available at an enormous number of web sites. This number continues to grow at a rate of around 60 million new pages annually. Such growth makes it impractical for all the information to be continuously reviewed and appropriately labeled. Thus, much of this content is uncategorized and therefore can be cumbersome to access.

This can also be true for information within linked documents. Linked documents contain hyperlinks within text of one document that is expounded upon in a disparate document. Such interlinking can provide a convenient cross-reference to content/terms referred to within an article. Wikipedia is a popular example of a linked documents and accounts for about 10 million articles written collaboratively by volunteers around the world. Almost all of the articles are created and revised by users who access the Wikipedia website according to certain policies and guidelines. Much of this content can remain uncategorized as the number of articles and contributors greater than the resources available to categorize such information. Thus, it is difficult if not impossible to identify the content within all the Wikipedia articles.

Systems and methods are needed to categorize content, such as linked documents, available on the Internet to facilitate trouble-free access of relevant information.

BRIEF DESCRIPTION

In one aspect, a system facilitates categorizing a group of linked web pages. A plurality of web pages each contains at least one link to another page within the group. A feature analyzer evaluates features associated with the one or more web pages to identify content, layout, links and/or metadata associated with the one or more web pages and identifies features that are labeled and features that are unlabeled. A graphing component creates a vector associated with each web page feature wherein vectors for unlabeled features are determined by their graphical proximity to features that are labeled. A co-training component receives the graph of vectors from the graphing component and leverages the disparate web page features to categorize each aspect of each feature of the page. A page categorizer receives aspect categorization information from the co-training component and categorizes the web page based at least upon this information.

In another aspect, a system categorizes a group of linked documents, wherein a small percentage of the group is labeled and a large percentage of the group is unlabeled. A plurality of web pages each contains content and layout aspects. A graphing component categorizes each unlabeled page by creating a vector associated with each unlabeled page feature and plotting the vectors on a graph alongside featured aspects. A co-training component utilizes the graphical information from the graphing component to categorize each aspect of the web page based at least in part upon the location of the vector within the graph and the categorization of other aspects within each of the plurality of web pages.

In yet another aspect, a method is utilized to categorize linked documents. Labeled and unlabeled features are extracted from a plurality of linked web pages. An expansion function is created for each feature wherein the expansion function is minimized to generate a vector that represents a category for each unlabeled feature. A graph of vectors is constructed based on each feature. Each feature graph categorization is co-trained based at least in part upon the graph categorization of each feature. Each linked web page is categorized based at least in part upon the co-training.

DETAILED DESCRIPTION

Figure 1:
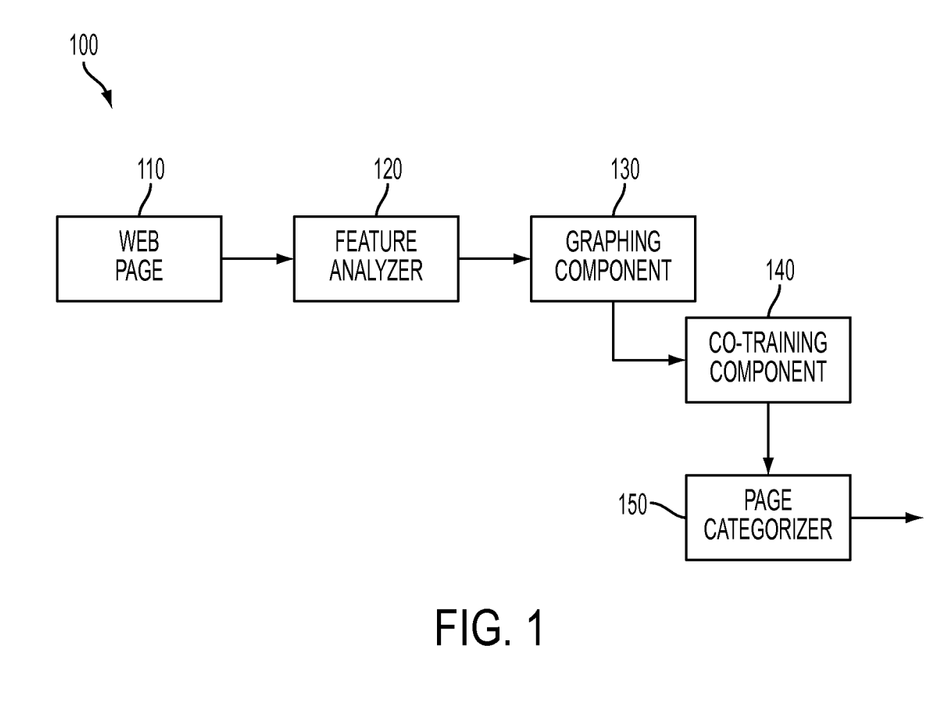
FIG. 1 illustrates a system to categorize linked web pages in accordance with an exemplary embodiment.

With reference to FIG. 1, a system 100 is illustrated that categorizes a group of linked web pages. This categorization is determined by leveraging information related to labeled features of web pages to categorize unlabeled features within the group. Web pages can be linked via one or more hyperlinks that a user can click-on to be directed to another page. The hyperlink generally instantiates code such as HTML to run a script that points to and loads a particular web address. In one example, words in a sentence serve as both content and as a mechanism to re-direct a user to supplemental information related to the original text. Some of the links and/or pages are labeled and thus can be used to provide contextual content to accurately identify and label unlabeled features.

The group of web pages is received by the system 100 to facilitate this categorization. For sake of clarity, a single page is received at a time as discussed herein. More particularly, a web page 110 is received by a feature analyzer 120 to ascertain features within the web page 110. Such features can relate to different aspects of the web page, wherein each feature is labeled or unlabeled. Once the features are identified, they are output to a graphing component 130 with an indication of whether the feature is labeled or unlabeled.

The graphing component 130 defines a vector for each feature within the web page 110 in view of features contained within other linked web pages. Such features can be accessed from a memory store 170 coupled to the graphing component 130. A co-training component 140 views each vector related to disparate aspects of the web page 110 in a single graph. In this manner, the vectors can be compared to each other to co-train and identify categorization for each feature within the web page 110. Once this identification is complete, a page categorizer 150 receives the data and assigns a category to a web page 110.

In one example, the web page 110 is one of a plurality of linked documents within an online encyclopedia such as Wikipedia. Content within Wikipedia can be broadly categorized into four different aspects for each article: 1) content—the set of words in the page; 2) layout—the set of HTML tags, attributes and their values in the pages. These features control the presentation of the page content to the viewer; 3) links—the set of hyperlinks in the page; and 4) metadata—all the information present in a page Infobox, including the template type, its attributes and values.

The system 100 can be utilized to categorize such a large set of linked documents with associated content, layout features, links and metadata. The system 100 can be especially beneficial when there is a small number of labeled pages (e.g., 10%) relative to a very large number of unlabeled ones (e.g., 90%) within a data set. The co-training component 140 can be utilized based on a natural split of page features, such as content vs. layout, layout vs. links, etc.

Utilizing two disparate feature sets allows an independence of categorizers to allow the co-training component 140 to operate successfully. The co-training principles apply according to which at least two alternative categorizers are built. The natural split of feature sets allows a first feature (e.g., content) and a second feature (e.g., layout) of the web page 110 to be described. Substantially any combination of web page 110 features is contemplated. By mining the layout characteristics of pages and applying feature selection methods, disparate categorizers can be employed to accurately categorize aspects of a group of web pages. A layout categorizer (e.g., a second categorizer) can provide accuracy comparable to a purely content-based categorizer (e.g., a first categorizer).

Figure 2:
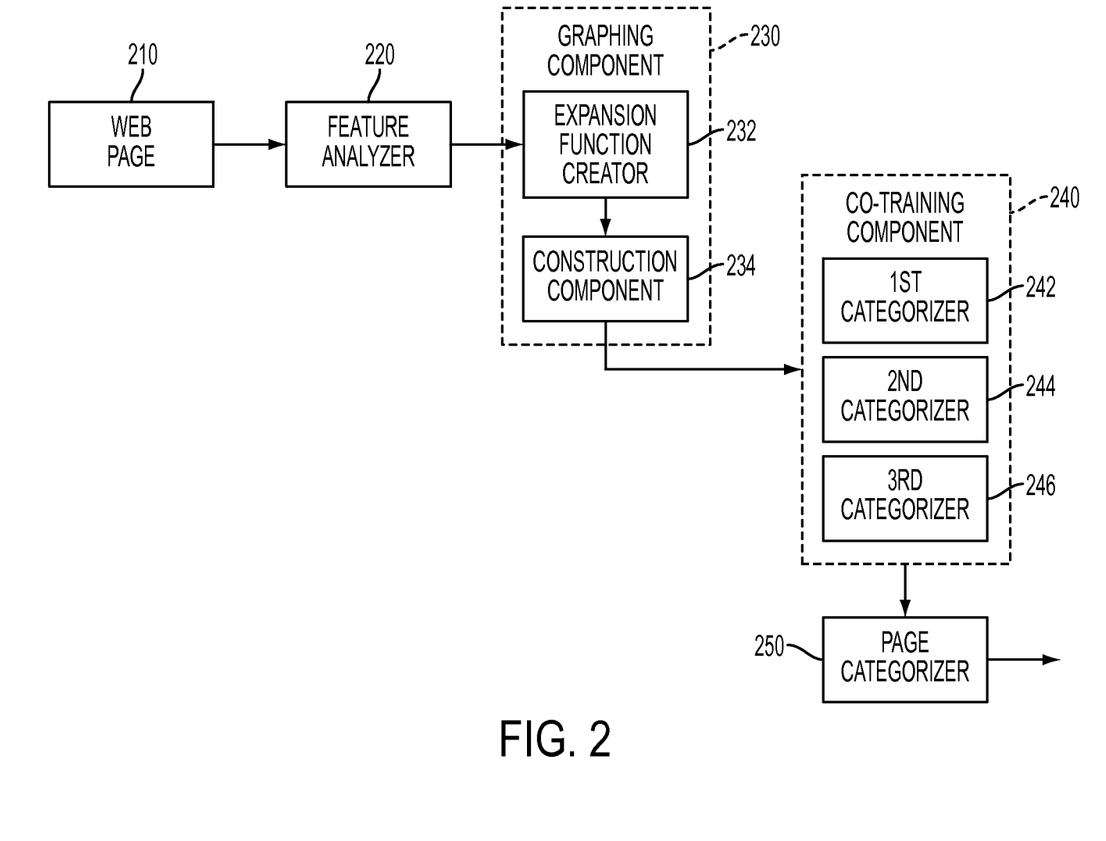
FIG. 2 illustrates a system to categorize linked web pages wherein a graphing component and a co-training component are more explicitly defined in accordance with an exemplary embodiment.

Referring now to FIG. 2, which illustrates a system 200 that includes a web page 210, a feature analyzer 220, a graphing component 230, a co-training component 240, a page categorizer 250 and a memory 270. The system 200 is substantially the same as the system 100, wherein the graphing component 230 further includes an expansion function creator 232 and a construction component 234. In addition, the co-training component 240 includes a first categorizer 242, a second categorizer 244 and a third categorizer 246.

The feature analyzer 220 first identifies features within the web page 210 and then determines if each of these features is labeled or unlabeled. In this graph-based approach, one node in the graph represents a single page (e.g., a Wikipedia article) as set forth in D. Zhou, O. Bousquet, T. Navin Lal, J. Weston, and B. S. Olkopf. Learning with local and global consistency. In *Advances in Neural Information Processing Systems* 16, pages 321-328. MIT Press, 2004, incorporated by reference herein. A weighted graph G with n nodes is indexed from 1 to n. In a symmetric weight matrix W, all weights are non-negative ($w_{ij} > 0$), and weight $w_{ij}$ represents the similarity between nodes i and j in the graph G. If $w_{ij} = 0$, there is no edge between nodes i and j.

It is assumed that the first/training nodes have labels, $y_1$, $y_2, \ldots, y_l$, where $y_i$ are from the category label set C, and the remaining $u = n - l$ nodes are unlabeled. The goal is to predict the labels of each unlabeled feature $y_{l+1}, \ldots, y_n$ by exploiting the structure of the graph. According to a smoothness assumption, a label of an unlabeled node is likely to be similar to the labels of its neighboring nodes. Thus, a more strongly connected neighbor node will more significantly affect the node.

The expansion function creator 232 generates an expansion function for each vector associated with each unlabeled feature of the web page 210. The construction component 234 receives the unlabeled vectors identified and constructs a graph, which includes the unlabeled vectors as well as vectors associated with labeled features of particular web pages. In this manner, vector properties for labeled features are learned and used to predict properties associated with unlabeled aspects of the web page 210.

The expansion function creator 232 establishes an expansion function based on several initial parameters. The label set C is assumed to include c different values, wherein each value is representative of a disparate category. A graph can be built by the construction component 234, in one example, by randomly sampling pairs of web pages from a group stored in the memory 270 and selecting the top weights for each web page. In one approach, a link graph can be utilized to insure the graph from one feature is connected to a graph from another feature.

The co-training component 240 utilizes the graphs constructed by the construction component 234 to identify appropriate categories for each disparate feature. In one example, three features are categorized via the first categorizer 242, the second categorizer 244 and the third categorizer 246 respectively. In one approach, the first categorizer is utilized with content, the second categorizer is utilized with the layout and the third categorizer is utilized with links associated with the web page 210.

A learning problem can be solved using each graph and simply selecting the most appropriate in terms of a cross validation error. In this manner, the integration of multiple views is employed to achieve a higher accuracy than any single view alone. To incorporate all the graphs, they can each be assigned a fixed uniform weight. The selection of graphs to be combined can affect the accuracy of the category prediction for each feature.

Figure 3:
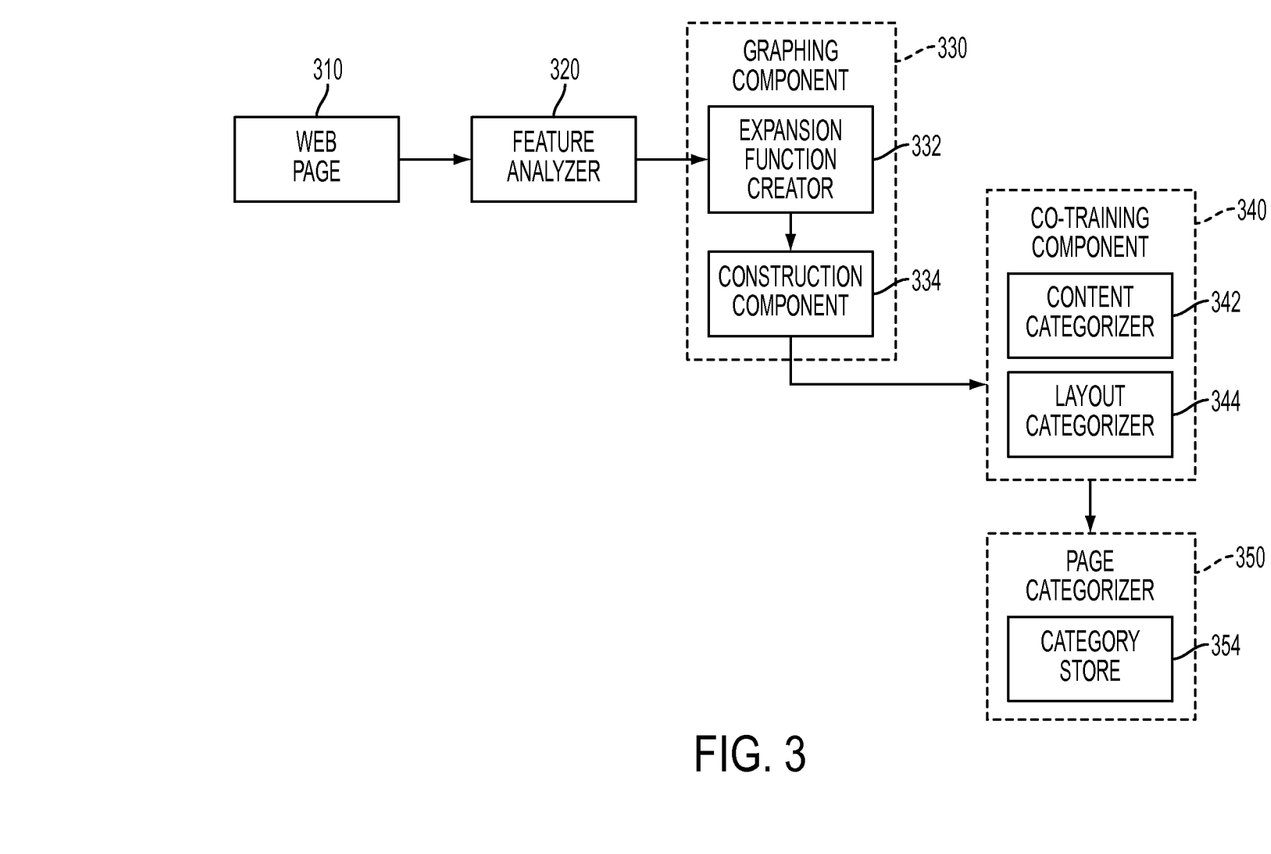
FIG. 3 illustrates a system to categorize linked web pages wherein a page categorizer is more explicitly defined in accordance with an exemplary embodiment.

FIG. 3 illustrates a system 300 and includes a web page 310, a feature analyzer 320, a graphing component 330, a co-training component 340, a page categorizer 350 and a memory 370. The system 300 is substantially similar to the system 200 wherein the graphing component 330 includes an expansion function creator 332 and a construction component 334. The co-training component 340 includes a content categorizer 342 and a layout categorizer 344.

The content categorizer 342 is used to categorize content features associated with the web page 310. Similarly, the layout categorizer 344 is used to categorize layout features associated with the web page 310. Specific embodiments provided below can be employed to facilitate such categorization. It is to be appreciated that the content categorizer 342 and the layout categorizer 344 are exemplary and that substantially any feature from the web page 310 can be have an associated categorizer.

The page categorizer includes a category store 354 that provides a plurality of categories from which to assign each feature. The category store 354 can allow the creation, storage and subsequent retrieval of substantially any number of categories. Such categories can be learned from previous iterations of categorization and/or added by the user.

Figure 4:
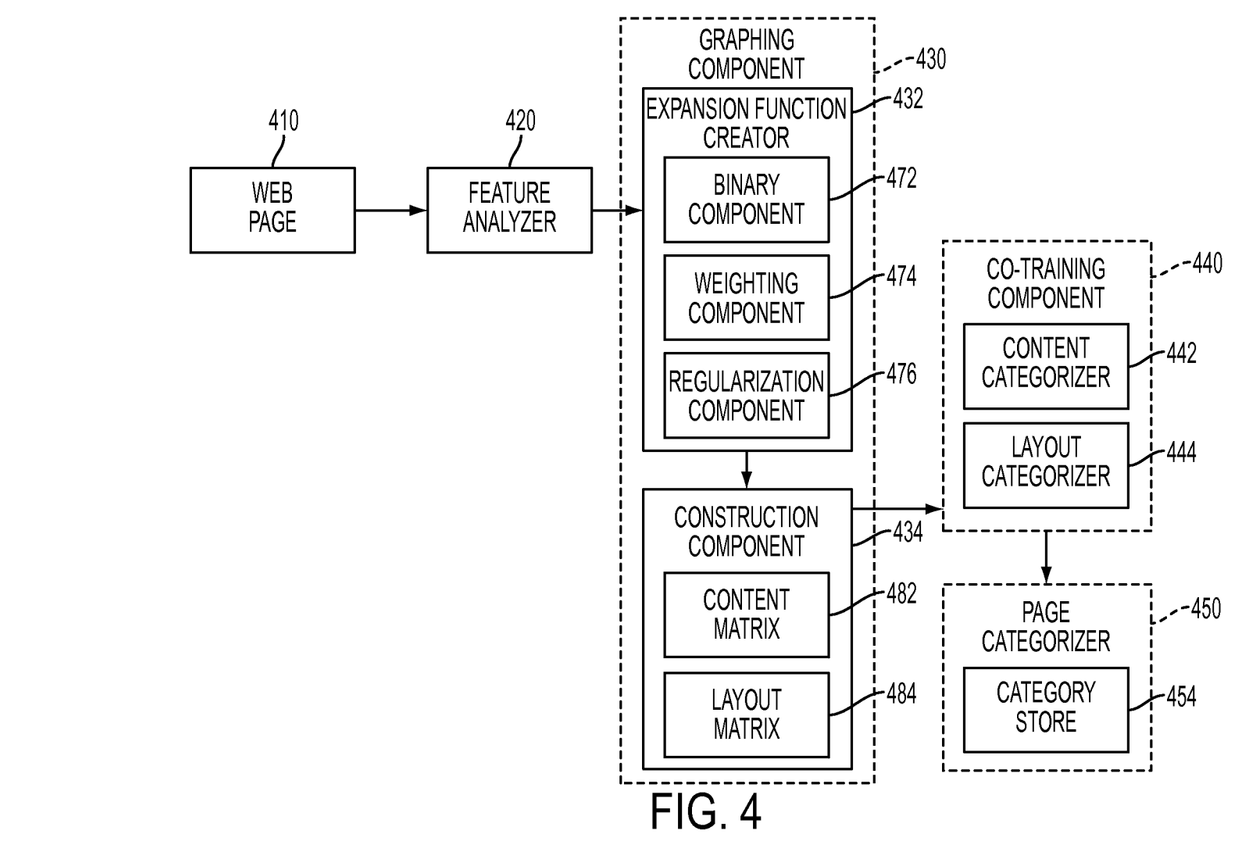
FIG. 4 illustrates a system to categorize linked web pages wherein the graphing component, co-training component and page categorizer are explicitly defined in accordance with an exemplary embodiment.

FIG. 4 illustrates a system that includes a web page 410, a feature analyzer 420, a graphing component 430, a co-training component 440, a page categorizer 450 and a memory 470. The graphing component 430 includes an expansion function creator 432 and a construction component 434. The system 400 is substantially similar to the system 300, wherein the expansion function creator 432 includes a binary component 472, a weighting component 474 and a regularization component 476. Further, the construction component 434 includes a content matrix 482 and a layout matrix 484.

The binary component 472, the weighting component 474 and the regularization component 476 can be utilized to help facilitate the creation and convergence of the expansion function. In particular, the binary component 472 can be employed to assign a label vector $Y_i$ for a node i as $Y_i = \{y_{ij} | y_{ij} = 1 \text{ if } j = y_i, 0 \text{ otherwise}\}$. That is to say, the binary component 472 makes an explicit determination as to whether or not a feature is to receive a label.

Further, the binary component 472 can define a prediction vector $Y_i$ for node i. For this purpose, an n×c dimensional score matrix can be defined as $\hat{Y} = (\hat{Y}_1, \ldots, \hat{Y}_n)$. In learning, $\hat{Y}$ can be determined using all the available information. In prediction, the labels can be predicted by thresholding the score vectors $\hat{Y}_{l+1}, \ldots, \hat{Y}_n$. It is assumed that (a) the score $\hat{Y}_i$ should be close to the given label vectors $Y_i$ in training nodes and (b) the score $\hat{Y}_i$ should not be too different from the scores of adjacent vertices. In one approach, $\hat{Y}$ can be determined by minimizing the following functional:

$$\min \mathcal{F}(\hat{Y}) = \sum_{i=1}^{l} \|\hat{Y}_i - Y_i\|^2 + \alpha \sum_{i,j=l+1}^{n} w_{ij} \|\hat{Y}_i - \hat{Y}_j\|^2. \quad (1)$$

where the first term corresponds to a loss function in terms of condition (a), and the second term represents a smoothness score in terms of condition (b). The parameter α trades off the loss versus smoothness.

In one embodiment, another regularization term, $\Sigma_{i=l+1}^{n} \|y\|^2$ can be added in order to keep the scores of unlabeled nodes in a reasonable range.

$$\min_{\hat{Y}} \|\hat{Y} - Y\|^2 + \alpha \|\hat{Y}^T L Y\|, \quad (2)$$

where the matrix L is the graph Laplacian matrix defined as $$L = D - W \text{ where } D = \text{diag}(d_i), d_i \Sigma_j w_{ij}.$$

Instead of L, the normalized Laplacian, $L = D^{-1/2} L D^{-1/2}$ can be used to get a similar result.

The weighting component 474 can provide an alternative approach wherein at each step, a node i receives a contribution from its neighbors j weighted by the normalized weight $w_{ij}$, and an additional small contribution given by its initial value. This process is detailed in Algorithm 1 below.

---
Algorithm 1 Label expanding
---
Require: Symmetric matrix W, $w_{ij} \geq 0$ (and $w_{ii} := 0$)
Require: Labels $y_i$ for $x_i$, i = 1, . . . , l
Ensure: Labels for $x_{l+1}, \ldots, x_n$
  1:    Compute the diagonal degree matrix D by $d_{ii} := \Sigma_j w_{ij}$
  2:    Compute the normalized graph Laplacian $L := D^{-1/2} W D^{-1/2}$
  3:    Initialize $\hat{Y}^{(0)} := (Y_1, \ldots, Y_l, \vec{0}, \vec{0}, \ldots, \vec{0})$, where $Y_i = \{y_{ik} | y_{ik} = 1 \text{ if } k = y_i, 0 \text{ otherwise}\}$
  4:    Choose a parameter $\alpha \in [0, 1)$
  5:    while not converged to $\hat{Y}^{(\infty)}$ do
  6:      Iterate $\hat{Y}^{(t+1)} := \alpha L \hat{Y}^{(t)} + (1 - \alpha) \hat{Y}^{(0)}$
  7:    end while
  8:    Label $x_i$ by $\text{argmax}_j \hat{Y}_i^{(\infty)}$

---

Algorithm 1 always converges, wherein an iteration equation is represented:

$$\hat{Y}^{(t+1)} = (\alpha \mathcal{L})^t \hat{Y}^{(0)} + (1 - \alpha) \sum_{i=0} (\alpha \mathcal{L})^i \hat{Y}^{(0)}. \quad (3)$$

As matrix $D^{-1/2} L D^{-1/2}$ is a stochastic matrix by construction, its eigenvalues are in [−1, 1] range. The matrix L is similar to $D^{-1/2} L D^{-1/2}$, and it has the same eigenvalues. Since α<1, eigenvalues of αL are in (−1,1) range. Therefore, when t→∞, $(\alpha L)^t \to 0$.

Using the matrix decomposition, $\Sigma_{i=0}(L)^i \to (I - \alpha L)^1$ so that the convergence $\hat{Y}^{(t)} \to \hat{Y}^{(\infty)} = (1 - \alpha)(I - \alpha L)^{-1} \hat{Y}^{(0)}$ is obtained. The convergence rate of the algorithm can depend on specific properties of the graph such as the eigenvalues of its Laplacian. The score matrix $\hat{Y}$ can be obtained by the weighting component 474 by solving a large sparse linear system $(I - \alpha L) \hat{Y} = Y^{(0)}$. As known, for efficient algorithms such as this, computational time is nearly linear in the number of non-zero entries in the coefficient matrix. Therefore, the computation gets faster as the Laplacian matrix gets sparser.

The regularization component 476 can be employed to provide proper categorization when real world data categories (e.g., as determined by the binary component 472 and/or the weighting component 472) are unbalanced. To solve this problem, category mass normalization can be performed, similar to that described in X. Zhu, Z. Ghahramani, and J. Lafferty, Semisupervised learning using Gaussian fields and harmonic functions, In *Proceedings of the Twentieth International Conference on Machine Learning*, pages 912-919, 2003, incorporated herein by reference. The categories can be rescaled so that their respective weights over unlabeled examples match the prior category distribution estimated from labeled examples.

The regularization component 476 can follow an exemplary algorithm to rescale categories. First, $p_j$ can denote the prior probability of category j estimated from the labeled examples:

$$p_j = \frac{1}{l}\sum_{i=1}^{l} y_{ij}.$$

Second, the mass of category j can be given by the average of estimated weights of j over unlabeled examples, $$m_j = \frac{1}{u}\sum_{i=l+1}^{n} \hat{y}_{ij}.$$

The category mass normalization can consist of scaling each category j by a factor $$v_j = \frac{p_j}{m_j}.$$

In other words, instead of the decision function $\text{argmax}_j \hat{y}_{ij}$, node i is categorized in the category determined by $\text{argmax}_j v_j \cdot \hat{y}_{ij}$. By utilizing such scaling, the regularization component 476 can provide a better categorization performance when there is an adequate number of labeled data to accurately estimate the category distribution, and when the unlabeled data comes from a substantially similar distribution.

To build a graph G, the construction component 434 can reuse a link structure utilized by the relevant group of linked documents (e.g., within Wikipedia) by transforming directed links into undirected links. In addition, self-links can be removed to as set forth in Algorithm 1 above. Links between nodes with high $w_{ij}$ are also removed that have different labels, in order to fit a smoothness condition.

An alternative to the link structure of a given document group can be utilized with the systems and methods disclosed herein. Conventional approaches build a k-NN graph by taking the top k weights $w_{ij}$ for each node. The exhaustive k-NN, however, is impossible for a group of linked documents, such as Wikipedia. In order to compensate for this truth, a graph G' is created by randomly sampling pairs of nodes from the group of interlinked documents and selecting the top k ones. It is to be appreciated that this method may generate a different graph G' that is dependent on the features selected for comparison (e.g., content vs. layout etc.). In order to guarantee that the graph is connected, it can be combined with the link graph.

The content matrix 482 is utilized to create a content-weighted matrix W that includes descriptors $x_i$ obtained via a "bag-of-words" model and standard tf-idf (term frequency-inverted document frequency) values as $x_{ij} = \text{tf}_{ij} \cdot \text{idf}_i$, where:

$\text{tf}_{ij}$ is the term frequency given by $$\sum_{k} n_{k,j},$$

where $n_{ij}$ is the number of occurrences of the term in document $d_j$, and the denominator is the number of occurrences of all terms in document $d_j$.

$\text{idf}_i$ is the inverted document frequency $$\log \frac{|D|}{|\{d_j : t_i \in d_j\}|},$$

where $|D|$ is the total number of documents and $|\{d_j : t_i \in d_j\}|$ is the number of documents where the term $t_i$ occurs.

The tf-idf weighting scheme is often used in the vector space model together with the cosine similarity to determine the similarity between two documents.

The layout matrix 484 is utilized to create a weighted matrix W provides node descriptors $x_i$ that are generated following the "bag-of-tags" approach which is similar to "bag-of-words" used in the content graph. Instead of words, it uses features of a page layout. In the HTML formatted pages, the presentation is guided by instruction encoded by HTML tags, attributes and their values. The HTML layout generally forms a nested structure. The "bag-of-tags" model might have different instantiations, provided below, where the terms form one of the following sets:

set of tag names, like <table> or <font>,
set of descendant tag pairs, like <table><span> or <tr><td>,
set of root-to-leaf paths in HTML page, like <html><body><table><tr><td> . . . ,
tag+attribute pairs, like <table font=" ">
tag+attribute+attribute value triples, like <table font="times">.

For any of these sets, descriptors $x_i$ for node i are extracted according to conventional tf-idf weights. The weighted matrix W can be built using the layout similarity between pages evaluated with "bag-of-tags" model and one of the listed tag sets. Once the similarity between the description vectors $x_i$ for all nodes in the graph G, a weighted matrix W can be obtained by measuring a similarity between two nodes i and j in G. Two exemplary measures are a Gaussian (GBF) kernel width and a cosine function. In the first example, the RBF kernel has a width σ and is given as:

$$w_{ij} = \exp\left(-\frac{\|x_i - x_j\|^2}{2\sigma^2}\right),$$

where the width σ is evaluated from the variance of the descriptors $x_i$. In the second example, the cosine function is utilized as set forth below:

$$w_{ij} = \frac{x_i \cdot x_j}{\|x_i\|\|x_j\|}.$$

It is to be appreciated that other similarity measures can be used in place of or in association with the above examples.

The co-training component 440 facilitates a solution by combining separate views of data associated with each feature. In each iteration of co-training, each of the two categorizers commits to more confident category labels for k≥1 features for each category—the ones that are most confidently rated. Co-training improves the categorizer performance when one categorizer gets mistaken for an unlabeled instance, whereas the other categorizer is very confident and adds the correct category label to the labeled data. This high confidence level can be used to supplant an otherwise incorrect label for a given feature. Thus, the independence of the views reduces the chance of both hypotheses agreeing on an erroneous label of an unlabeled instance.

Figure 5:
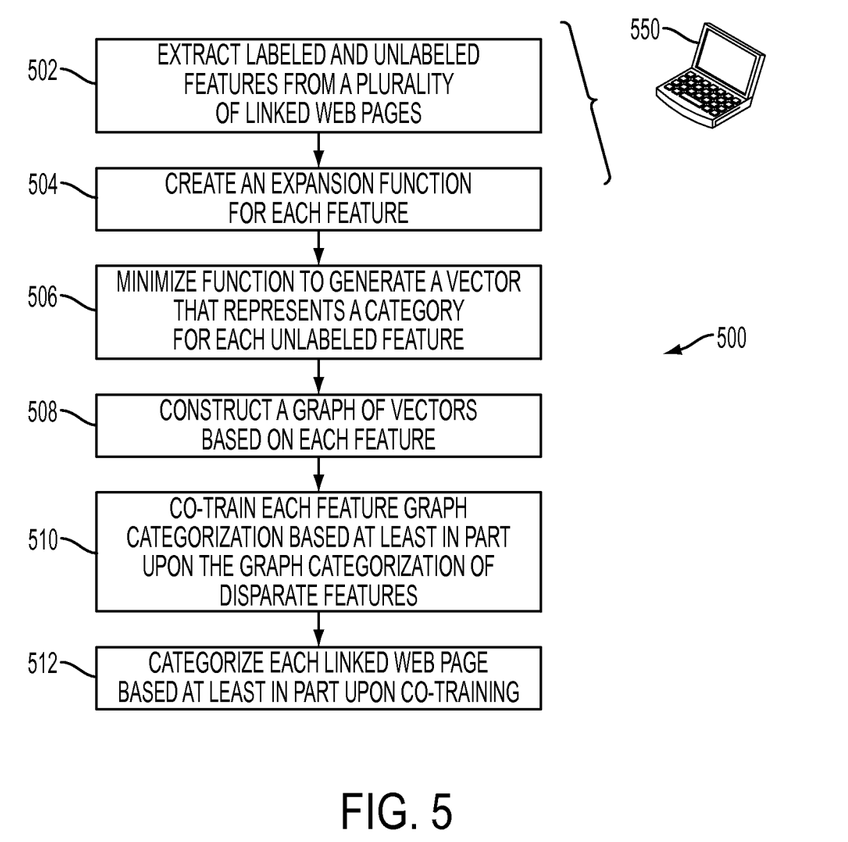
FIG. 5 illustrates a method to categorize linked web pages based at least in part upon co-training in accordance with an exemplary embodiment.

Referring now to FIG. 5, which illustrates a method 500 to categorize linked web pages based at least in part upon co-training. At reference numeral 502, labeled and unlabeled features are extracted from a plurality of linked web pages. At 504, an expansion function is created for each feature. At 506, the function is minimized to generate a vector that represents a category for each unlabeled feature. A graph of vectors is constructed at 508 based on each feature.

At 510, each feature graph categorization is co-trained based at least in part upon the graph categorization of disparate features from the linked web pages. Each linked web page is categorized at 512 based at least in part upon co-training. In this manner, unlabeled features from the linked web pages can be categorized based at least in part upon the labeled features of the disparate web pages linked thereto.

Figure 6:
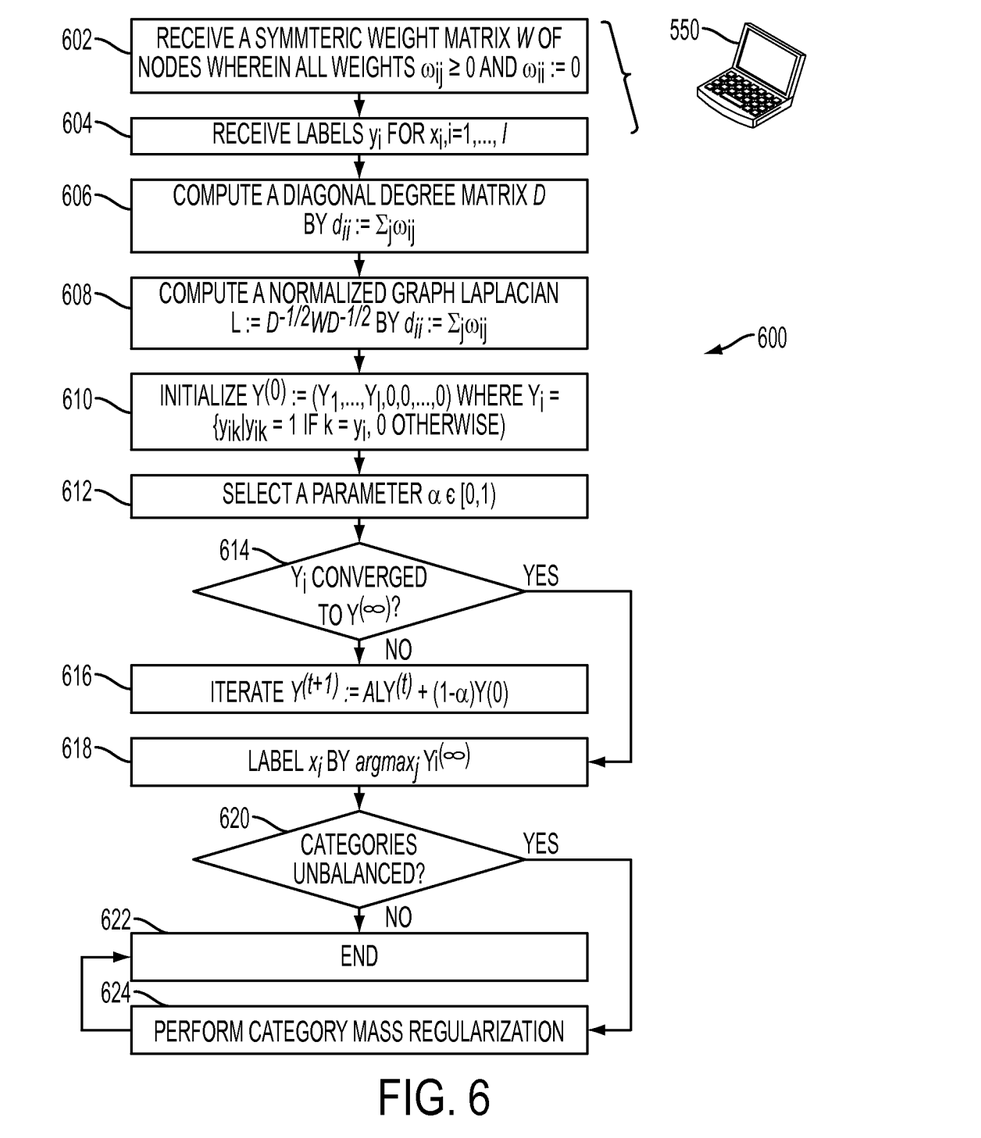
FIG. 6 illustrates a method to minimize a function to generate a vector that represents a category for unlabeled features within linked web pages in accordance with an exemplary embodiment.

FIG. 6 illustrates a method 600 to generate a vector for an unlabeled web page. At 602, a symmetric weight matrix W is received of nodes wherein all weights $w_{ij} \geq 0$ and wherein $w_{ii}:=0$. At 604, labels $y_i$ are received for $x_i$, $i=1,\ldots,l$. At 606, a diagonal degree matrix D by $d_{ii}:=\Sigma_j w_{ij}$. At 608, a normalized graph Laplacian $L:=D^{-1/2}WD^{-1/2}$ is computed. At 610, $\hat{Y}^{(0)}$ is initialized, wherein $\hat{Y}^{(0)}:=(Y_1,\ldots,Y_l,\vec{0},\vec{0},\ldots,\vec{0})$, where $Y_i=\{y_{ik}|y_{ik}=1 \text{ if } k=y_i, 0 \text{ otherwise}\}$. At 612, a parameter $\alpha$ within [0,1] is selected.

If $Y_i$ is converged to $Y^\infty$, at 614, $x_i$ is labeled by $\text{argmax}_j \hat{Y}_i^{(\infty)}$. If $Y_i$ is not converged to $Y^\infty$ then $\hat{Y}^{(t+1)}:=\alpha L\hat{Y}^{(t)}+(1-\alpha)\hat{Y}(0)$ is iterated. A check is made at 620 to verify whether the categories are unbalanced for the web pages. If the categories are unbalanced, at 624, a category mass regularization, as set forth above, is performed. If categories are not unbalanced, the method ends at 622.

Figure 7:
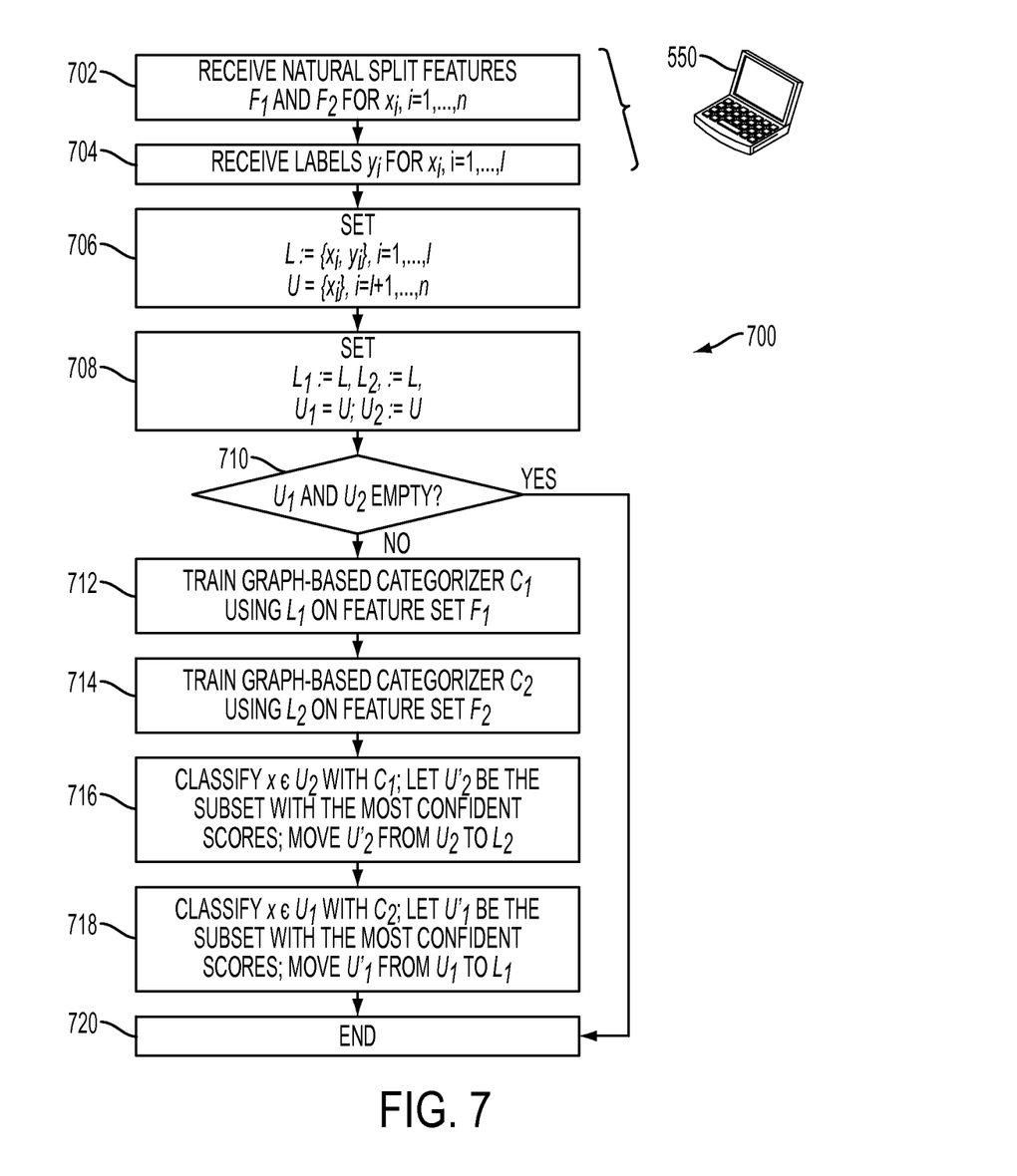
FIG. 7 illustrates a method to co-train disparate feature graphs categorization in accordance with an exemplary embodiment.
Figure 8:
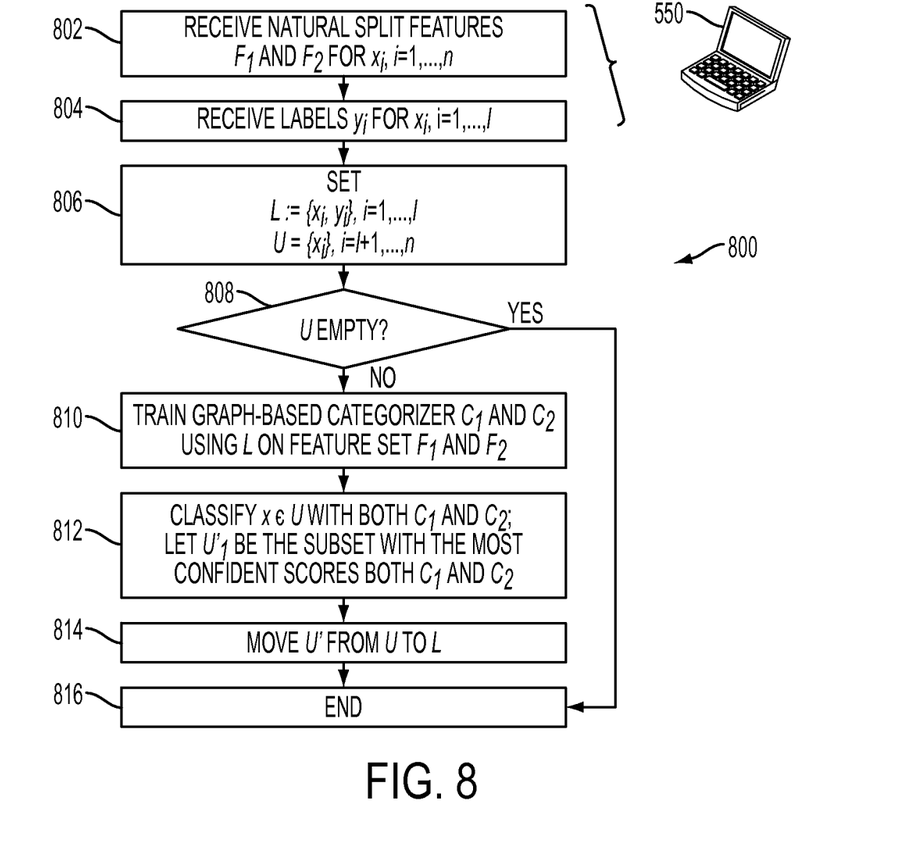
FIG. 8 illustrates a method to co-train disparate feature graph categorizations by voting in accordance with an exemplary embodiment.

FIG. 7 below describes the co-training technique with the natural split of feature set. FIG. 8 illustrates a voting variation of FIG. 7, where at each iteration, unlabeled instance in U are categorized with both categorizers $C_1$ and $C_2$, and a subset of features with the most confidence sum is selected for moving to the labeled set L. A particular example of web page categorization via co-training is to identify homepages of faculty members. It is to be appreciated that a web page can be represented by the text on the page, but also by the text of hyperlinks referring to the page.

FIG. 7 illustrates a method 700 utilized to classify nodes via co-training, wherein the nodes have a natural feature split. At 702, natural split features $F_1$ and $F_2$ for $x_i$, $i=1,\ldots,n$ are received. At 704, labels $y_i$ for $x_i$, $i=1,\ldots,l$ are received. At 706, labels for $x_{l+1},\ldots,x_n$ are set for $L:=\{x_i,y_i\}$, $i=1,\ldots,l$, $U=\{x_i\}$, $i=l+1,\ldots n$ and, at 708, $L1:=L$, $L2:=L$, $U1:=U$, $U2:=U$.

If $U_1$ and $U_2$ are empty at 710, the method ends at 720. If $U_1$ and $U_2$ are not empty, at 712, graph-based categorizer $C_1$ is trained using $L_1$ on feature set $F_1$. At 714, a graph-based categorizer $C_2$ is trained using $L_2$ on feature set $F_2$. At 716, nodes x within a subset of $U_2$ are classified with $C_1$ wherein $U'_2$ is a subset with the most confident scores wherein nodes within $U'_2$ are moved from $U_2$ to $L_2$. At 718, nodes x within the subset $U_1$ are classified with $C_2$ wherein $U'_1$ is a subset with the most confident scores wherein $U'_1$ is moved from $U_1$ to $L_1$. Once the classification is complete at 718, the method ends at 720.

FIG. 8 illustrates a method 800 utilized to facilitate co-training by voting with a natural feature split. At 802, natural split features $F_1$ and $F_2$ for $x_i$, $i=1,\ldots,n$ are received. At 804 labels $y_i$ for $x_i$, $i=1,\ldots,l$ are received. At 806, labels for $x_{l+1},\ldots,x_n$ are set for $L:=\{x_i,y_i\}$, $i=1,\ldots,U=\{x_i\}$, $i=l+1,\ldots n$. If U is empty, at 808, the method ends at 816. If U is not empty, at 808, graph-based categorizers $C_1$ and $C_2$ are trained using L on feature set $F_1$ and $F_2$ at 810. x as a subset of U is classified with both $C_1$ and $C_2$; let U' be the subset with the most confident scores by both $C_l$ and $C_2$. At 814, U' is moved from U to L and, at 816, the method ends.

Page text can include words occurring on a page and/or hyperlink text (set of words occurring in hyperlinks) that point to that page. This makes possible to create two views to apply co-training. In one example, this co-training can be employed to categorize faculty home pages. In contrast, linked pages that have low correlation between hyperlinks (such as Wikipedia) may not be as successful. Thus, utilizing hyperlink text can be a poor predictor that can cause failure of co-training. In our approach, instead of hyperlinked text, page layout and/or metadata can be as a good predictor as a text-based approach.

A computer 550 illustrates one possible hardware configuration to support the systems and methods described herein, including the methods 500, 600, 700 and 800 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 550 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between features within the computer, such as during start-up, is stored in ROM.

The computer 550 can further include a hard disk drive, a magnetic disk drive, e.g., to read from or write to a removable disk, and an optical disk drive, e.g., for reading a CD-ROM disk or to read from or write to other optical media. The computer 550 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 550 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 550 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 550 via any wireless or hard wire protocol and/or standard.

The computer 550 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the features described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

In one example, a evaluation of n=114,366 pages from a Wikipedia XML Corpus is conducted. Ten percent of these pages are annotated (l=11.437) and ninety percent of the pages (u=102,929) are unannotated over c=15 categories. Global characteristics of the corpus are given in Table 1 below. The word set is composed of all lexemized keywords; neither non-English nor stop words were excluded.

TABLE 1

Wikipedia collection: some characteristics.

| Set | Size | Set | Size |
| --- | --- | --- | --- |
| Text words | 727,66 | Tag + attribute pairs | 5,772 |
| Infobox templates | 7 602 | Root-to-leaf paths | 110,099 |
| Infobox tags | 1,208 | Tag + attribute + value | 943,422 |
| Tags | 1,257 | triples Hyperlinks | 636,187 |

In this experiment, the accuracy of a given transductive categorizer uses a ten-fold cross validation on the training set (in the presence of unlabeled data). As a baseline method, semi-supervised learning is utilized with a transductive support vector machine (TSVM) with $x_i$ node descriptors as feature values as set forth in T. Joachims. Transductive inference for text classification using support vector machines. In *ICML '99: Proceedings of the Sixteenth International Conference on Machine Learning*, pages 200-209, San Francisco, Calif., USA, 1999. Morgan Kaufmann Publishers Inc., incorporated herein by reference. Content, structure and Infobox views are combined by concatenating the corresponding descriptors. Direct concatenation of these alternative views, however, brings no benefit. Table 2 sets forth the evaluation results.

For the co-training method with the graph-based categorizers, we used the link-based graph of Wikipedia enriched with extra links sampled from non-linked node pairs, with matrices $W_c$ (for $C_1$) and $W_S$ (for $C_2$) being generated with content or layout similarity measures, respectively. Using tag+attribute descriptors enriched with Infoboxes generates a transductive categorizer whose performance is comparable to the content categorizer. Finally, to achieve the best performance, we deploy methods 700 and 800 on two graph based categorizers obtained with the content and structure similarity. Table 2 reports all the evaluation results of the co-training and compare them to TSVM ones.

TABLE 2

Performance evaluation for different methods.

| TSVM Method | Acc (%) | LP Method | Acc (%) | Comment |
| --- | --- | --- | --- | --- |
| Content | 73.31 | $C_1$: Content | 75.03 | Cosine |
| Tag + Attr | 72.74 | $C_2$:Tag + Attr | 72.19 | Gaussian, $\delta = 1.5$ |
| Paths | 59.43 | $C_2$: Paths $C_2$: Tag + Attr + InfoBox | 64.82 | " |
| Tag + Attr + InfoBox | 72.92 | | 74.75 | " |
| Content + Tag + Attr + IB | 73.13 | Co-training, $C_1\&C_2$: Tag + Attr + IB | 77.86 | Algorithm 2 |
| | | Co-training, $C_1\&C_2$: Tag + Attr + IB | 78.03 | Algorithm 3 |

Figure 9:
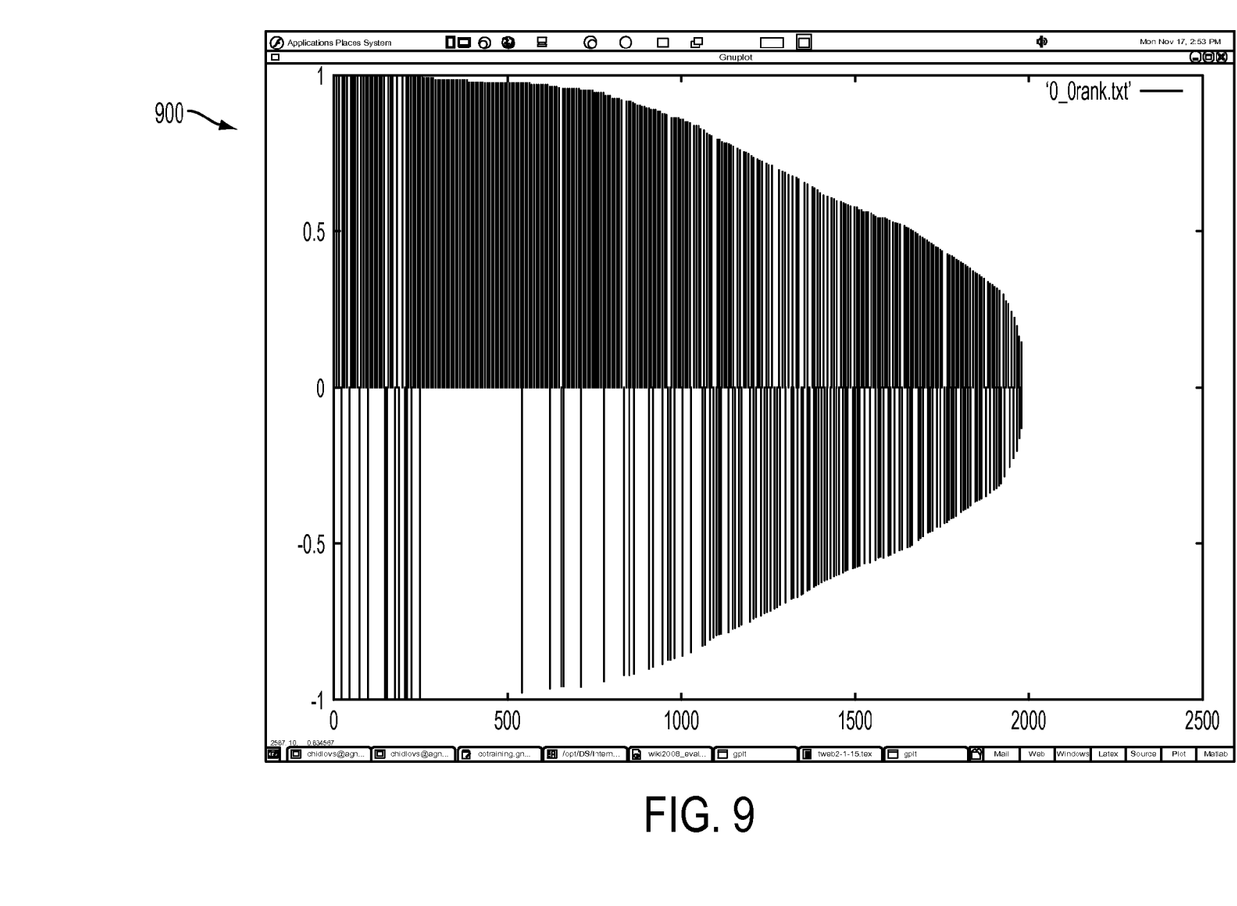
FIG. 9 illustrates behavior of voting based co-training by plotting a confidence value at a first generation in accordance with an exemplary embodiment.
Figure 10:
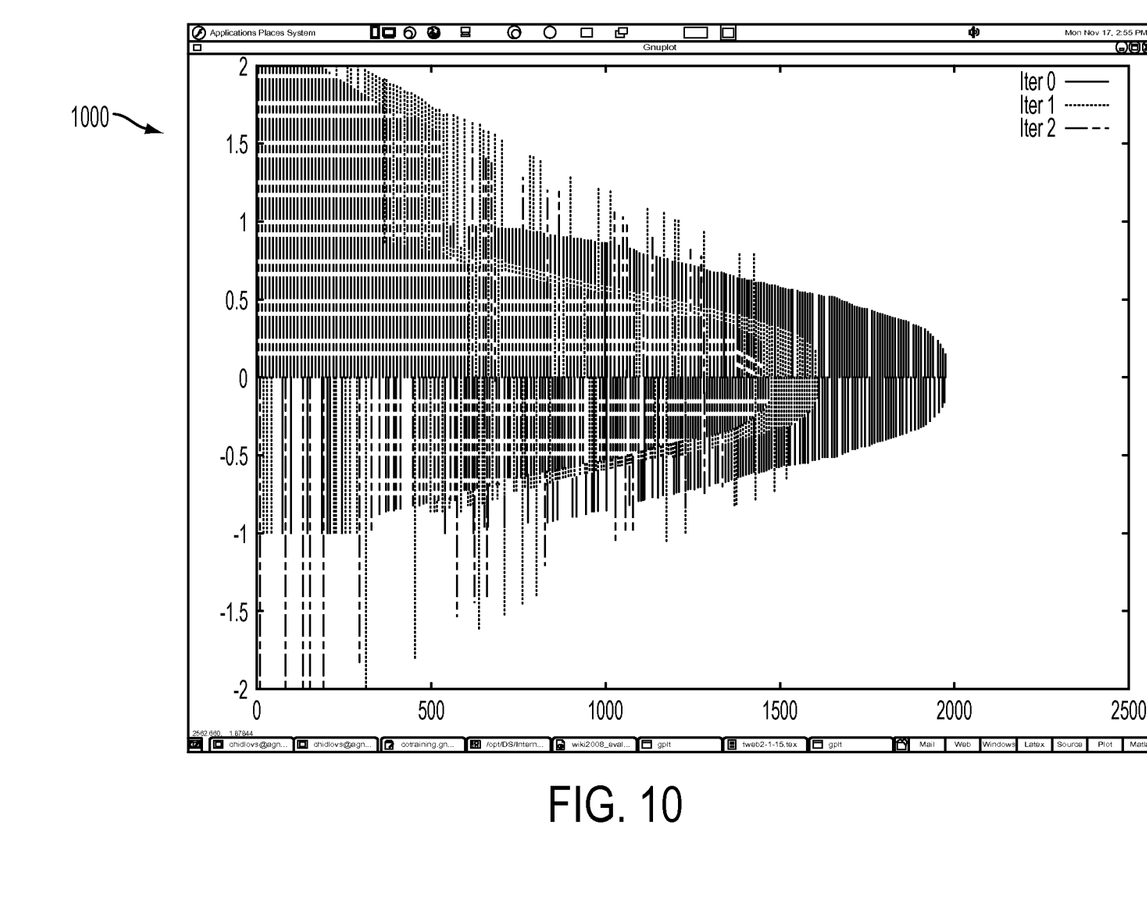
FIG. 10 illustrates a voting based co-training over three first iterations in accordance with an exemplary embodiment.

FIGS. 9 and 10 demonstrate the behavior of the voting-based co-training, as set forth in the method 800 above. The number of items to accept at each iteration is $20v_i$ per category i where $v_i$ is the category weight. In particular, FIG. 9 plots the confidence value at the first iteration where the voted confidence is given by $\max_i \frac{1}{2}(p_i^1+p_i^2)$, and $p_i^j$ is the confidence of categorizer $C_j$ to assign instance x to category i. The confidence value is shown as a positive value if the category is correct, and as a negative (multiplied by −1) value if the category is wrong.

FIG. 10 shows the evolution of sets L and U over three first iterations. Confidence values for all features x moved from U to L at each iteration are multiplied by 2 (both positive and negative). The disparate cross hatchings refer to confidence values and decisions at first, second and third iterations.

There are multiple ways to extend the categorization systems and methods described herein. In one example, a bag-of-words and bag-of-tags approach can be extended with a scalable feature selection technique in order to make the descriptors $x_i$ more compact and concise. In another example, the method 700 can include graph regularization as utilized in the method 800. Finally, the transductive categorizers can be extended to the inductive mode, where it can be used to categorize new unseen pages.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that categorizes a group of linked web pages, comprising:
   a plurality of web pages stored on a non-transitory computer readable medium, each page contains at least one link to another page within the group;
   a feature analyzer using a processor that evaluates features associated with the one or more web pages to identify content, layout, links and/or metadata associated with the one or more web pages and identifies features that are labeled and features that are unlabeled;
   a graphing component using the processor that creates a vector associated with each web page feature and a graph including every vector created wherein vectors for unlabeled features are determined by their graphical proximity to features that are labeled;
   a co-training component using the processor that receives the graph of vectors from the graphing component and leverages the disparate web page features to categorize each aspect of each feature of the page; and
   a page categorizer using the processor that receives aspect categorization information from the co-training component and categorizes the web page based at least upon this information.

2. The system that categorizes linked documents of claim 1, wherein the graphing component further includes:
   an expansion function creator that creates an expansion function to label each unlabeled feature of the web page.

3. The system that categorizes linked documents of claim 2, further including:
   a construction component that sees the information from the expansion function creator and plots a vector associated with each labeled and unlabeled feature of the web page.

4. The system that categorizes linked documents of claim 2, wherein the expansion function creator further includes:
   a binary component to determine whether a feature receives a label;
   a weighting component that provides a label for a web page feature based on a normalized weight; and
   a regularization component that corrects values determined by the weighting component by rescaling the respective weights of the features over unlabeled examples match prior category distribution estimated from labeled examples.

5. The system that categorizes linked documents of claim 1, wherein the construction component further includes:
   a content matrix that defines a content weighted matrix; and
   a layout matrix that defines a layout element weighted matrix.

6. The system that categorizes linked documents of claim 5, wherein the content matrix uses a bag-of-words model to create respective matrices.

7. The system that categorizes linked documents of claim 5, wherein the layout matrix uses a bag-of-tags model to create respective matrices.

8. The system that categorizes linked documents of claim 1, wherein the co-training component further includes:
   a first categorizer that categorizes a first web page feature based at least upon information received from the graphing component;
   a second categorizer that categorizes a second feature of the web page based at least upon information received from the graphing component; and
   an nth categorizer that categorizes an nth feature of the web page based at least upon information received from the graphing component.

9. The system that categorizes linked documents of claim 1, wherein the page categorizer further includes:
   a category store to store, edit, and retrieve a plurality of categories utilized to categorize the one or more web pages.

10. The system that categorizes linked documents of claim 1, wherein the co-training component further includes:
    a content categorizer that categorizes features associated with the content of the one or more web pages; and
    a layout categorizer that categories aspects associated with the layout of the one or more web pages.

11. The system that categorizes linked documents of claim 10, wherein the content categorizer is trained based on the content features, the layout categorizer is trained based on layout features wherein confidence scores are associated with each categorization such that the aspects with the highest confidence scores are associated with one of the content categorizer and the layout categorizer.

12. A method to categorize a group of linked documents, wherein a small percentage of the group is labeled and a large percentage of the group is unlabeled, comprising:
    a plurality of web pages that each contain content and layout aspects;
    a graphing component that categorizes each unlabeled page by creating a vector associated with each unlabeled page feature and plotting the vectors on a graph;
    a co-training component that utilizes the graphical information from the graphing component to categorize each aspect of the web page based at least in part upon the location of the vector within the graph and the categorization of other aspects within each of the plurality of web pages.

13. The system to categorize linked documents of claim 12, wherein the co-training component includes:
   a content categorizer that categorizes features of each web page associated with content.

14. The system to categorize linked documents of claim 13, wherein the content categorizer obtains weights for each aspect utilizing a textual similarity between pages.

15. The system to categorize linked documents of claim 12, wherein the co-training component includes:
   a layout categorizer that categorizes aspects of the web page based on characteristics of the page.

16. The system to categorize linked documents of claim 15, wherein the layout categorizer weights are obtained using the layout/visualization similarity between pages.

17. The system to categorize linked documents of claim 15, wherein the co-training component includes a metadata categorizer, wherein weights are obtained using similarity of metadata between the pages.

18. The system to categorize linked documents of claim 12, wherein the graphing component constructs a similarity graph utilizing a weighted label expansion function, each function associated with an aspect of each of the plurality of web pages.

19. The system to categorize linked documents of claim 12, wherein the co-training component utilizes data from previously categorized pages to categorize pages received subsequently.

20. A method to categorize linked documents, comprising:
   extracting labeled and unlabeled features from a plurality of linked web pages the features including content, layout, links and metadata features;
   creating an expansion function for each feature;
   minimizing the expansion function to generate a vector that represents a category for each unlabeled feature;
   constructing a graph of vectors based on each feature;
   co-training each feature graph categorization based at least in part upon the graph categorization of each feature; and
   categorizing each linked web page based at least in part upon the co-training.

* * * * *